July 8, 1958
J. W. CROWNOVER
2,841,827
PROCESS FOR PRODUCING ELECTROMECHANICALLY
SENSITIVE SHEET MATERIAL
Filed April 26, 1954
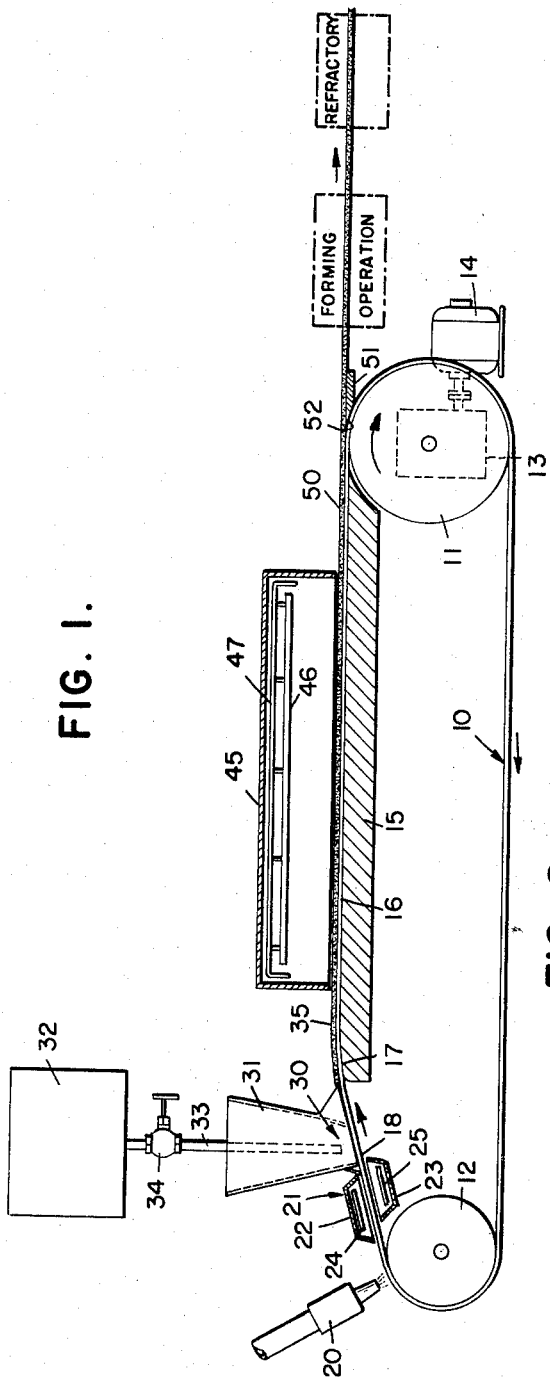
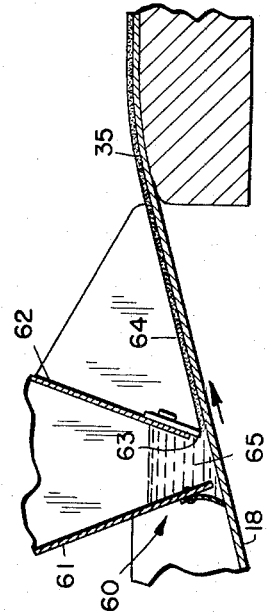
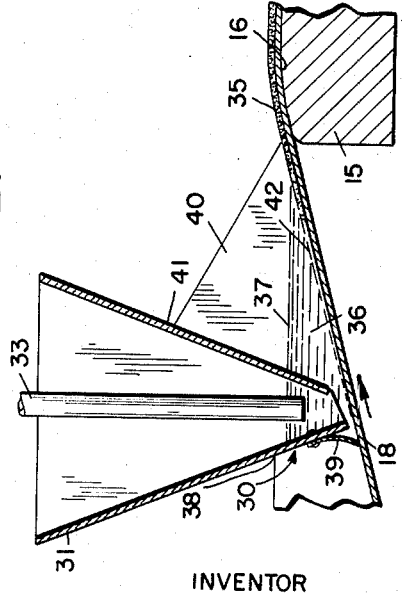
INVENTOR
JOSEPH. W. CROWNOVER
BY
ATTORNEYS ём
United States Patent Office 2,841,827
Patented July 8, 1958

2,841,827

PROCESS FOR PRODUCING ELECTROMECHANICALLY SENSITIVE SHEET MATERIAL

Joseph W. Crownover, Sherman Oaks, Calif., assignor, by mesne assignments, to Electric Machinery Mfg. Company, a corporation of Minnesota Application April 26, 1954, Serial No. 425,664

6 Claims. (Cl. 18—57)

This invention relates to the production of ceramic materials and more particularly to an improved method for making thin sheets of ceramic material adapted for use in electrical applications, such as for electrostrictive purposes.

It is an object of my invention to provide an improved method for continuously producing thin ceramic sheets or plates without having to effect and to control the withdrawal of volatiles or other ceramic vehicles during production of the sheets.

It is another object of my invention to provide an improved method for producing thin sheets of ceramic material having a tough and flexible quality, the sheets being readily adapted to be formed and baked to produce thin ceramic plates of uniform thickness and improved quality.

It is a further object of my invention to provide a novel method for the production of a very thin sheetlike ceramicware of uniform thickness in which comminuted ceramic particles are dispersed throughout a body of polymerized thermoplastic resin, the ware being adapted to be baked at elevated temperatures to produce high quality ceramic sheets.

These and other objects and advantages will become apparent in the following specification taken in conjunction with the drawings, wherein:

Fig. 1 comprises a side elevation of one form of apparatus by means of which my invention may be carried out;

Fig. 2 is an enlarged elevation, partly in section, of a portion of Fig. 1; and

Fig. 3 is another view similar to Fig. 2 showing a modified form of the apparatus.

According to my invention, comminuted ceramic materials, such as barium titanate, strontium titanate, or lead titanate, or a combination of these, plus impurities, is mixed with a liquid thermoplastic resin and a suitable plasticiser in the correct proportions to form a thick liquid adapted to flow onto a moving flat surface in a uniform layer. The preferred composition of the liquid comprises a comminuted ceramic material or a pigment mixed with low molecular weight liquid polyvinyl chloride resin and a suitable liquid plasticiser, the relative weights of the various components being within the proportions ten to twelve pounds of comminuted ceramic, one to three pounds of liquid polyvinyl chloride, and one to three pounds of the plasticizer with exact proportions depending on the thickness of the slip desired.

These ingredients are mixed to form a liquid having a viscosity similar to that of a heavy paint. The liquid is then deposited upon a preheated moving surface in such a way that the thickness of the thin layer, or slip, is uniform within very small tolerance limits. Before the slip is deposited on the surface, a thin layer of a parting agent such as mineral oil is sprayed thereon in order to prevent coagulation of portions of the thin layer or slip after deposition thereof upon the moving surface, and also to aid in the removal of the product therefrom after subsequent heat treatment.

The moving surface, preferably comprising a thin metallic member, such as a steel band, is preheated to a temperature somewhat above the polymerization temperature of the resin used, and when the thin layer of slip is deposited on the surface, those portions of the layer adjacent the heated surface will be momentarily heated to the polymerization temperature of the resin, resulting in the formation of an adherent film of liquid on the surface. The fact that polymerization is induced in that portion of the resin in intimate contact with the metallic surface is sufficient to aid materially in the production of a uniformly thin layer or film of slip material.

The thin slip layer is next subjected to an elevated temperature for a length of time sufficient to complete the curing of the liquid resin to produce a tough flexible sheet or ware, within which the ceramic particles are surrounded and bonded together by the polymerized resin. For rapid polymerization of the polyvinyl chloride, the temperature should be maintained between 350° and 375° F. It is understood that lower temperatures may be utilized in conjunction with a longer time or duration of heat treatment of the slip.

Removal of the ware from the metallic surface is effected by means of a knife or blade set at a slight angle to the surface and in contact therewith to separate the ware without deforming or injuring it. The ware is then cut to size and baked at the sintering temperature of the ceramic to bring about burning out of the polymerized resin and to induce combination and uniting together of the ceramic particles. The oven temperatures for sintering are critical, and should lie within the range 2430° to 2460° F. For example, sintering of a sample of ware at 2440° for one hour gives very favorable results.

Referring to the drawing illustrating the apparatus by means of which the present process may be carried out, the numeral 10 refers to an endless, thin, metallic belt which is carried between a driver drum 11 and an idler drum 12, the belt moving generally clockwise in the drawing. The belt may comprise a thin steel band about .010" thick, and of suitable width. The driver drum may be rotated by a speed reducer unit 13 driven by an electric motor 14. The upper portion of the belt moving from left to right is supported by an elongated flat body 15 in such a way that the belt moves along the upper surface 16 of the body. The supporting body 15 is positioned on a level somewhat above the top 17 of the driver drum so that the portion 18 of the belt coming off the drum 11 must travel upwardly as well as rightwardly at a moderate inclination in order to meet the upper surface 16 of the support.

That portion 18 of the belt which comprises the left end portion thereof is first sprayed with a parting agent, such as mineral oil, from a nozzle 20 positioned above the belt near the drum 11, and then heated as by means of the radiant heat-producing means 21. The latter is disposed somewhat beyond nozzle 20, and includes metal shields 22 and 23 enclosing radiant heating elements 24 and 25 disposed both above and below the belt. The heating elements may comprise electrical resistors.

As the belt advances upwardly and rightwardly beyond the heating means 21, it comes into engagement with and rides upon the sloping upper surface 27 of the left-hand portion 28 of body 15. While the belt is still advancing upwardly, it passes beneath the delivery end 30 of a hopper 31 which contains the liquid mixture to be deposited upon the belt. The liquid in hopper 31 is kept at a relatively constant level therein by means of regulated flow of mixture from a second hopper 32 positioned above hopper 31 and connected thereto by a duct or pipe 33 having a suitable control valve 34 connected therein. A constant level or head of the liquid mixture in hopper 31 facilitates a uniform flow of the liquid therefrom onto the belt or band 18, thereby aiding in the deposition of a uniformly thick layer of slip thereon.

Referring to Fig. 2, the hopper 31 is shown in section to illustrate the method of depositing the slip on the portion 18 of the belt 10. The hopper 31 containing the liquid mixture 36 is positioned above the inclined portion of the belt traveling uphill in order that the upper level 37 of liquid mixture 36 may be kept below the level of the upper surface of the belt moving along surface 16. The reason for this arrangement is to effect a rising movement of the belt 18 upwardly and through the surface 37 of the liquid mixture 36 with a consequent natural separation of the deposited layer of slip 35 upon the belt from the general mass of liquid mixture in the hopper. Liquid mixture in the hopper is kept from escaping and flowing downhill between the belt 18 and the lower lip of the rear wall 38 of the hopper by means of a leather or felt wiper 39 attached to the rear wall 38. Likewise, liquid mixture is kept from escaping from beneath the side walls 40 of the hopper by means of similar wipers (not shown). It will be noted that side wall 40 extends forwardly beyond the forward limit of the pool of liquid mixture. Forward wall 41 of the hopper 31 extends downwardly toward the belt 18 and toward rear wall 38, leaving sufficient clearance between the belt 18 and the lower lip 42 thereof to allow the liquid mixture 36 to flow thereunder.

As the preheated belt 18 advances rightwardly beyond wiper 39, it comes into contact with the liquid mixture 39. The first portion of the mixture 36 coming into contact with the belt is subjected to the temperature of the belt, which is somewhat above the polymerization temperature of the liquid resin in the mixture. For example, the belt should be preheated to a temperature between 400° and 450° F. when liquid polyvinyl chloride is used. That portion of mixture 36 coming into contact with the belt is therefore subjected to temperatures sufficient to initiate the polymerization reaction, which results in a certain degree of thickening of the resin in contact with the belt. However, the heat stored in the metallic belt is quickly dissipated, and further reaction is arrested. The result is that a very thin, somewhat more viscous film or layer 42 of liquid mixture, shown as a broken line, is formed on the upper surface of the belt as it passes beneath the delivery end 30 of the hopper 31, and when the belt rises and breaks the surface 37 of the liquid 36, it carries with it a film of liquid of desired thickness, called the slip. The thickness of slip 35 may of course be controlled accurately by adjusting the temperature to which belt 18 is preheated.

The thin layer 35 formed on the belt is next subjected to extended heating sufficient to complete polymerization of the resin contained therein. As shown in Fig. 1, the belt carries the slip beneath a hood 45 within which a source of heat radiation is provided by several elongated electrical resistors 46 disposed beneath suitable reflectors 47. The resistors are disposed horizontally above the belt so as to uniformly heat the moving slip 35. The length of the resistors 46 is made sufficient to subject the moving slip to the required temperature for a length of time adequate to bring about complete polymerization thereof. For example, if the temperature at the surface of the slip 35 is maintained between 350° and 375° F., only a few minutes are required to bring about the polymerization of the resin. Lower temperatures may be used in conjunction with longer heat treatment requiring slower belt speeds, and resulting in slower production rates.

The end product of the heat treatment, called ware 50, is removed from the belt with the aid of a blade 51, the end 52 of which scrapes the moving belt at a slight angle thereto. The ware is cut to size by appropriate mechanism (not shown) which may comprise a punch press, or some other means.

The cut or formed pieces of ware are next placed in trays in a refractory, and baked at sintering temperatures for a length of time and at temperatures indicated above, in order to burn out the polymerized resin and plasticizer and to bring about growth and combining of the smaller grains of ceramic and to effect bonding and uniting of enlarged grains. The end result is a uniformly thin plate of practically pure ceramic, of excellent quality.

Referring to Fig. 3, an alternative method for forming the thin layer or slip 35 is illustrated. The steel belt 18, inclined and moving upwardly, passes beneath the delivery end 60 of a hopper 61, the forward wall 62 of which extends downwardly to a point 63 closely adjacent the surface of the belt. The lower edge 63 of the wall is referred to as the doctor blade for the reason that the gap or distance between edge 63 and the upper surface of the belt passing thereunder operates to control the thickness of the layer 64 of mixture deposited on the belt. The liquid in hopper 61 seeks to escape between blade 63 and belt 18 by gravity flow; however, the rate at which it does so is governed by the height adjustment of the doctor blade, and the speed of the belt moving past the doctor blade is adjusted to match the rate of egress of fluid from beneath the doctor blade, thereby giving the desired thickness of layer 64 on the upper surface of the belt. The inclination of surface 27 is not so great as to cause layer 64 to flow back downhill and disrupt the uniformity of thickness thereof. Since the doctor blade operates to control the thickness of the slip 35, the belt need not be preheated in the example shown.

It should be noted that the present method or process for making thin ceramicware utilizes substances for the carrying and bonding of the comminuted ceramic which represent 100% solids—that is, with no volatiles being present. One substantial advantage accruing from the use of such substances resides in the elimination of the necessity for removing such volatiles from the liquid mixture or from the slip. In the past, the removal of such volatiles presented a difficult problem requiring accurate and critical controls, since too rapid removal led to bubbling of the thin slip during heat treatment thereof, and failure to remove all of such volatiles prior to sintering resulted in the production of a non-uniform and inferior ceramic plate. Furthermore, the forced draft commonly used to remove such volatiles had to be moisture free, or else water vapor became absorbed in the slip, inhibiting the curing thereof.

Mention should also be made of the fact that the use of a thermoplastic resin with a suitable plasticizer in the present process is unorthodox. It would ordinarily appear that the use of thermoplastic resin in producing ceramic articles to size would be impractical due to the shrinkage problem involved. The resin when cured undergoes considerable shrinkage, ordinarily making it extremely difficult to maintain accurate dimensions of the resultant ceramic article. However, the present process is directed to the production of thin sheets of ceramic in which only the thickness dimension of the article need be controlled. Shrinkage in the plane of the sheets presents no material problem, since the sheets are cut to size after heat treatment or curing thereof. Shrinkage in the thickness dimension remains critical, but since the sheets are very thin, such shrinkage is easily controlled by adjusting the temperature and time duration of curing and by effecting the initial deposition of a layer of slip of such thickness that when cured, the slip will shrink to the thickness dimension desired. Furthermore, the use of a thermoplastic resin precludes warpage and bending of the ware during sintering. It has been found that low molecular weight liquid polyvinyl chloride gives excellent results in that the ware produced is of uniform thickness and has very desirable physical properties.

Attention should also be directed to the fact that waves or undulations in the belt do not adversely affect the uniformity of thickness of the slip layer, since preheating of the belt governs the thickness of the layer. In other words, the slip does not tend to build up in thickness in the belt valleys and thin out on the belt humps, because the thickness of the layer is controlled by heat flow from the belt into the liquid contacting the surface thereof. Since heat flow is uniform from all areas of the belt into the liquid, uniformity of thickness of the slip is maintained with exceptional accuracy.

Further embodiments, modifications, and variations may be resorted to within the spirit of the invention as set forth in the following claims.

I claim:

1. In a method of forming ceramic materials in thin layers from a viscous film-forming liquid mix containing comminuted ceramic solids and a liquid resin medium for suspending the solid particles, the comminuted solids being in sufficient amount to form a thin ceramic ware; the steps of providing a moving uniformly inclined, impervious surface, forming a body of the liquid mix on a portion of the moving inclined surface so that the said surface supports said body of mix; passing said surface upwardly at a uniform angle to the horizontal beneath the said body of mix at all areas of contact between the said surface and mix; moving said surface out of contact with a free surface of said body of mix at said angle whereby a film of mix adheres to the surface of a thickness dependent on said angle and on the depth of the body of mix and is drawn from beneath the body of mix; and moving said surface horizontally at a level above the upper level of said body of mix.

2. In a method of forming barium titanate ceramic bodies in thin layers from a viscous film-forming liquid mix containing comminuted barium titanate solids and polymerizable liquid resin, the comminuted solids being present in a sufficient amount to form a thin ceramic ware and the mix being congealable upon the application of heat thereto; the steps of providing a moving uniformly inclined, impervious surface; forming a body of the liquid mix on a portion of the inclined surface so that said surface supports the said mix; passing said surface upwardly at a uniform angle to the horizontal beneath said body of liquid mix at all areas of contact between the said surface and mix; preheating said impervious surface before contact with said liquid mix to cause said mix to congeal adjacent said surface and form an adherent film thereon; moving said surface out of contact with a free surface of said body of mix at said angle whereby a film of adherent mix of a thickness dependent on the amount of preheating is withdrawn from beneath the bottom of said body of mix; and moving said surface horizontally at a level above the upper level of said body of mix.

3. The method of claim 1 including the step of subjecting the film on the horizontal portion of the moving surface to elevated temperatures for a length of time sufficient to bring about transformation of the said film into a flexible ware.

4. The method of claim 1 including heating the adherent film on the horizontal portion of the moving surface at an elevated temperature to form a flexible ware in which ceramic particles are uniformly dispersed, cutting said ware to size and baking the said cut ware at a temperature within the sintering temperature range for said ceramic solids until a rigid ceramic plate is formed.

5. The method of claim 1 wherein the liquid resin consists essentially of polyvinyl chloride.

6. The method of claim 1 wherein the said surface is a thin metallic band and preheating said band to a temperature sufficient to change the viscosity of the liquid mix adjacent the said surface before it passes beneath the body of mix.

References Cited in the file of this patent

UNITED STATES PATENTS

| | | |
|---|---|---|
| Re. 24,114 | Adler | Jan. 24, 1956 |
| 2,120,720 | Spanel | June 14, 1938 |
| 2,170,441 | Albright | Aug. 22, 1939 |
| 2,327,765 | Carver | Aug. 24, 1943 |
| 2,439,802 | Francis | Apr. 20, 1948 |
| 2,441,235 | Blair et al. | May 11, 1948 |
| 2,486,410 | Howatt | Nov. 1, 1949 |
| 2,554,327 | Gravley | May 22, 1951 |
| 2,539,446 | Lies | Jan. 30, 1951 |
| 2,582,993 | Howatt | Jan. 22, 1952 |

FOREIGN PATENTS

| | | |
|---|---|---|
| 500,298 | Great Britain | Feb. 7, 1939 |